United States Patent
Burgschat et al.

(10) Patent No.: US 6,807,499 B2
(45) Date of Patent: Oct. 19, 2004

(54) CONTROL DEVICE OF A POSITION MEASURING SYSTEM

(75) Inventors: Reiner Burgschat, Jena (DE); Werner Metzner, Jena (DE); Robert Stelzner, Göttem (DE)

(73) Assignee: Johannes Heidenhain GmbH, Traunreut (DE)

(*) Notice: Subject to any disclaimer, the term of this patent is extended or adjusted under 35 U.S.C. 154(b) by 0 days.

(21) Appl. No.: 10/302,791

(22) Filed: Nov. 21, 2002

(65) Prior Publication Data

US 2004/0026603 A1 Feb. 12, 2004

(30) Foreign Application Priority Data

Nov. 21, 2001 (DE) .......................................... 101 57 112

(51) Int. Cl.⁷ .............................................. G06F 19/00
(52) U.S. Cl. .......................................... 702/94; 702/194
(58) Field of Search .......................... 702/94, 95, 150, 702/151, 152, 153, 155, 157, 158, 162, 163, 166, 167, 168, 194; 700/56, 57, 186, 192, 193

(56) References Cited

U.S. PATENT DOCUMENTS

| | | |
|---|---|---|
| 5,128,609 A | 7/1992 | Howley |
| 5,241,173 A | 8/1993 | Howley et al. |
| 5,579,246 A * | 11/1996 | Ebersbach et al. ............. 702/95 |
| 5,883,298 A * | 3/1999 | Holzapfel et al. ............. 73/1.79 |
| 5,943,639 A * | 8/1999 | Tanaka et al. ............... 702/163 |
| 5,973,620 A * | 10/1999 | Holzapfel et al. ............. 341/11 |
| 6,605,828 B1 * | 8/2003 | Schwarzrock et al. ........ 257/81 |
| 6,662,131 B2 * | 12/2003 | Freitag et al. .............. 702/106 |
| 2001/0030283 A1 | 10/2001 | Strasser |

FOREIGN PATENT DOCUMENTS

| | | |
|---|---|---|
| DE | 44 28 673 A1 | 2/1996 |
| EP | 0 390 886 B1 | 1/1994 |
| EP | 1 126 248 A2 | 8/2001 |
| WO | WO 90/02956 | 3/1990 |

* cited by examiner

Primary Examiner—Patrick J Assouad
(74) Attorney, Agent, or Firm—Brinks Hofer Gilson & Lione

(57) ABSTRACT

A method for generating an indication regarding the amplitude level of at least one scanning signal of a position measuring system by determining an amplitude level of at least one scanning signal of a position measuring system, generating an amplitude signal based on the determined amplitude level. Forming a deviation signal by comparing the generated amplitude signal with a predetermined nominal signal and providing an indication of a proper set-up of a scanning head of the position measuring system as a function of the deviation signal, wherein with a weak deviation signal, a change in the deviation signal causes a small, or no variation of the indication, and in contrast thereto a larger variation of the indication is caused by a stronger deviation signal.

14 Claims, 4 Drawing Sheets

CONTROL DEVICE OF A POSITION MEASURING SYSTEM

Applicants claim, under 35 U.S.C. § 119, the benefit of priority of the filing date of Nov. 21, 2001 of a German patent application, copy attached, Serial Number 101 57 112.7, filed on the aforementioned date, the entire contents of which is incorporated herein by reference.

BACKGROUND OF THE INVENTION

1. Field of the Invention

The present invention relates to a control device for controlling the amplitude level of at least one analog scanning signal of a position measuring system. The present invention furthermore relates to a scanning head for the position measuring system, to the position measuring system, and to a method for generating an indication regarding the amplitude level by the control device.

2. Discussion of Related Art

A control of the scanning signals is required particularly when installing the position measuring system. The signal quality, and therefore the accuracy of measurement depends to a considerable extent on the exact adjustment of the scanning head in relation to the scale. To assure a high degree of measuring accuracy in connection with incremental position measuring systems, the scanning signals generated by the scanning head should have a high and identical amplitude, as well as a mutual phase offset of 90°. The amplitude is essentially determined by the position of the scanning head with respect to the scale, i.e. the distance, rotation and lateral shift of the scanning head perpendicularly with respect to the measuring direction in relation to the scale.

In accordance with WO 90/02956, these parameters of the analog scanning signals can be represented by an oscilloscope. For this purpose, the two scanning signals, which are offset by 90° with respect to each other, are conducted to the two channels of a dual-trace oscilloscope, so that a Lissajous shape is generated on the screen. The radius of the Lissajous shape is a measure of the amplitudes, as well as of the phase relationship between both scanning signals.

In accordance with U.S. Pat. No. 5,241,173, the entire contents of which are incorporated herein by reference, the scanning signals are fed to a control device, which compares the amplitude value with a threshold value. If the amplitude value falls below the threshold value, a display device is activated, which is used as an indication that the scanning head has been incorrectly installed in relation to the scale. It is essential here that the control device exclusively outputs information which provides an indication as to whether the scanning head has been correctly or incorrectly installed.

It was already noted that this indication alone is not sufficient for the installation, and that it is advantageous for the user to also receive an indication regarding the signal tendency. To this end it is suggested in EP 1 126 248 A2 to form a deviation signal by comparing the amplitude value with a predetermined nominal value. This deviation signal is used on the one hand for adjusting the scanning signal to a constant amplitude level and, on the other hand it is used as an indication regarding the functional status of the position measuring system. The deviation signal is a measure of the actual scanning distance and is used for setting an optimal scanning distance. The indication provided, for example, in the form of a visual display is proportional to the deviation signal. Changes in the amplitude level in the area of the nominal value have the same effect on the indicator signal as changes in the amplitude level at a greater distance from the nominal value. This makes the adjustment of the position of the scanning head with respect to the scale, as well as the functional control, more difficult.

OBJECT AND SUMMARY OF THE INVENTION

An object of the present invention is based on disclosing a control device for controlling the amplitude level of at least one scanning signal of a position measuring system, by which an indication can be generated, which permits an improved statement regarding the functional state.

This object is attained by a control device for controlling an amplitude level of an analog scanning signal of a position measuring system, the control device includes a detector that determines an amplitude level of a scanning signal of a position measuring system and generates an amplitude signal as a function of the amplitude level. A deviation determination unit that generates a deviation signal by comparing the amplitude signal with a predetermined nominal signal and an indicator that provides an indication of proper set-up of a scanning head of the position measuring system as a function of the deviation signal. An evaluation arrangement for differently weighting the deviation signal in such a way that with a weak deviation signal, a change in the deviation signal causes a small, or no variation of the indication, and in contrast thereto a larger variation of the indication is caused by a stronger deviation signal.

This object is attained by a scanning head of a position measuring system that has a control unit. The control unit includes a detector that determines an amplitude level of a scanning signal of a position measuring system and generates an amplitude signal as a function of said amplitude level. A deviation determination unit that generates a deviation signal by comparing the amplitude signal with a predetermined nominal signal and an indicator that provides an indication of proper set-up of the scanning head of the position measuring system as a function of the deviation signal. An evaluation arrangement for differently weighting the deviation signal in such a way that with a weak deviation signal, a change in the deviation signal causes a small, or no variation of the indication, and in contrast thereto a larger variation of the indication is caused by a stronger deviation signal.

This object is attained by a position measuring system that includes a scale and a scanning head that scans the scale, wherein the scanning head has a control device. The control device includes a detector that determines an amplitude level of a scanning signal of a position measuring system and generates an amplitude signal as a function of the amplitude level. A deviation determination unit that generates a deviation signal by comparing the amplitude signal with a predetermined nominal signal and an indicator that provides an indication of proper set-up of the scanning head as a function of the deviation signal. An evaluation arrangement for differently weighting the deviation signal in such a way that with a weak deviation signal, a change in the deviation signal causes a small, or no variation of the indication, and in contrast thereto a larger variation of the indication is caused by a stronger deviation signal.

Another object of the present invention is to disclose a method for forming an indication of proper set-up of a scanning head by providing meaningful information.

This object is attained by a method for generating an indication regarding the amplitude level of at least one scanning signal of a position measuring system by determining an amplitude level of at least one scanning signal of a position measuring system, generating an amplitude signal based on the determined amplitude level. Forming a deviation signal by comparing the generated amplitude signal with a predetermined nominal signal and providing an indication of proper set-up of a scanning head of the position measuring system as a function of the deviation signal, wherein with a weak deviation signal, a change in the deviation signal causes a small, or no variation of the indication, and in contrast thereto a larger variation of the indication is caused by a stronger deviation signal.

Details, as well as advantages of the present invention ensue from the following description of exemplary embodiments of the present invention, making reference to the drawings.

DETAILED DESCRIPTION OF THE PREFERRED EMBODIMENTS

Figure 1:
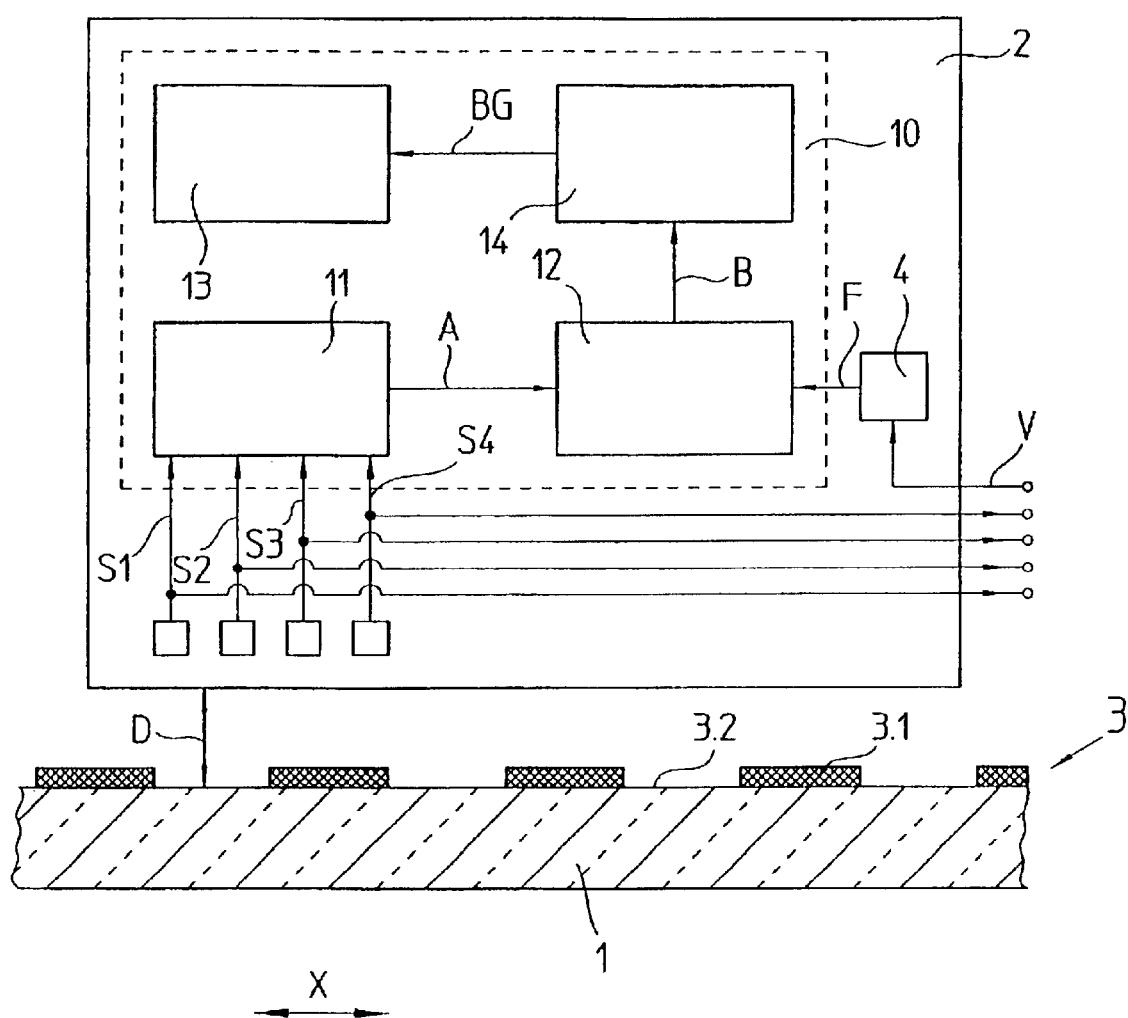
FIG. 1 is a schematic block diagram of an embodiment of a position measuring system with a control device in accordance with the present invention.

The position measuring system represented in FIG. 1 includes a scale 1, as well as a scanning head 2. The scale 1 is for example a measuring tape, which has a graduation 3 on its surface, which includes alternating reflecting areas 3.1 and non-reflecting areas 3.2. The scanning head 2 scans the graduation 3 of the scale 1 in the measuring direction X, and in the course of this generates several periodic analog scanning signals S1, S2, S3 and S4, which are phase-shifted by 90° with respect to each other. The amplitude level of these scanning signals S1 to S4 is a function of the position of the scanning head in relation to the scale 1, in particular of the scanning distance D. So that the position measuring system can function, it is necessary that the amplitude level does not fall below a defined value. Therefore, in the course of mounting the scanning head 2 relative to the scale 1 it is of particular importance to adjust the position with respect to the scale 1 in such a way that the amplitude is at a sufficient level.

In accordance with the present invention, the amplitude level of the scanning signals S1 to S4 is monitored by a control device 10, which has a detector 11 for determining the amplitude level of the scanning signals S1 to S4 and for generating an amplitude signal A as a function thereof, a deviation determination unit 12 for forming a deviation signal B by comparing the amplitude signal A with a preset nominal signal F, an evaluation arrangement 14 for weighting the deviation signal B differently, as well as indicator 13 for providing an indication of proper set-up of the scanning head as a function of the weighted deviation signal BG.

Figure 2:
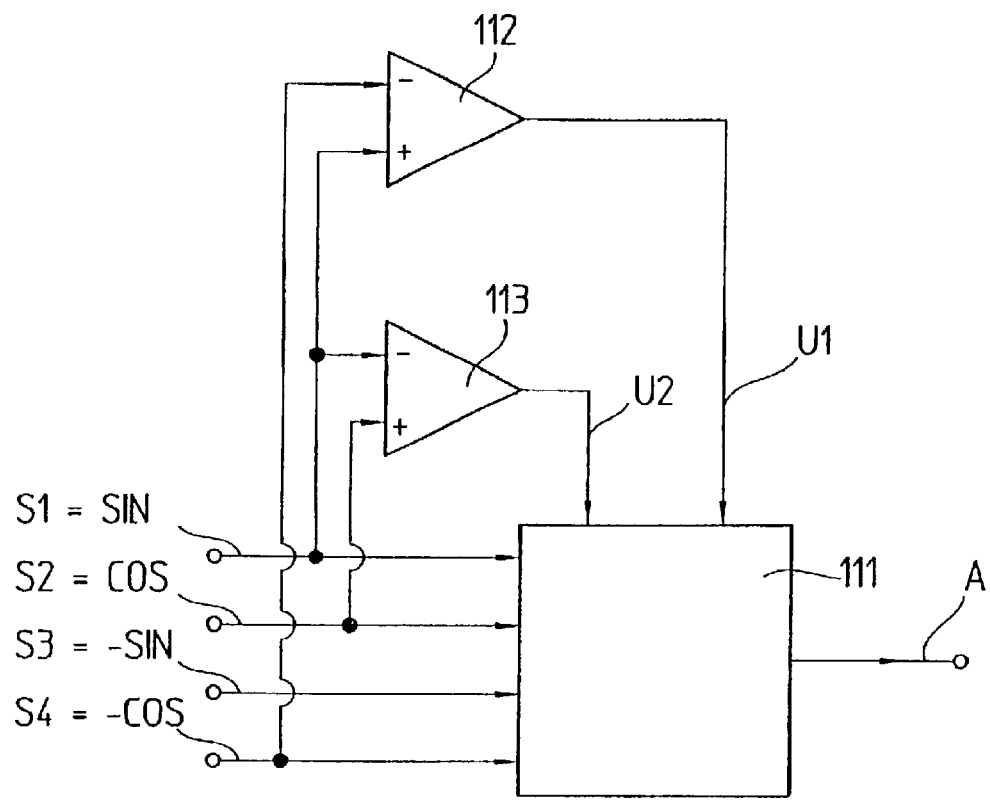
FIG. 2 represents an embodiment of a circuit for forming an amplitude signal in accordance with the present invention.
Figure 3:
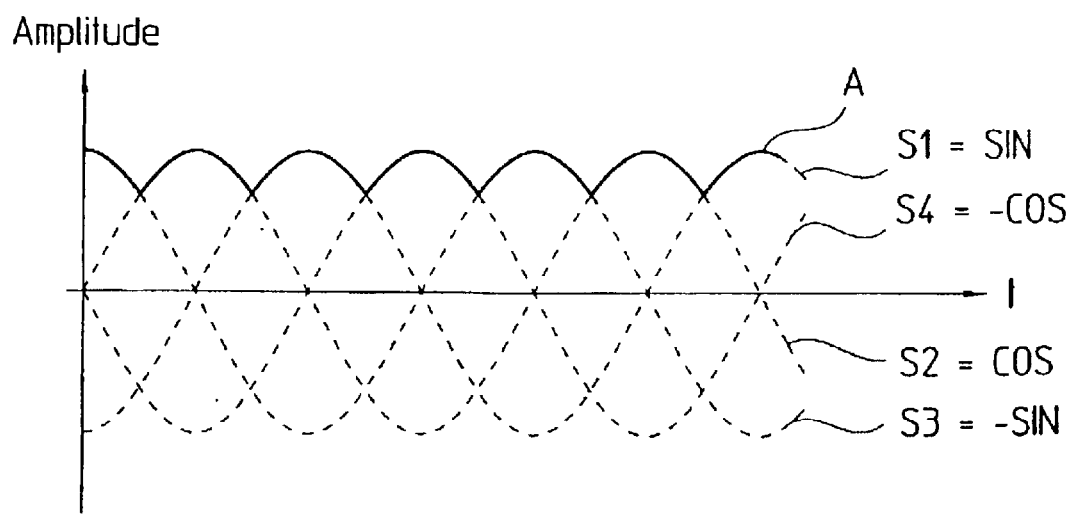
FIG. 3 is a signal diagram in connection with FIG. 2.

The detector 11 is represented in FIG. 2 and includes a multiplexer 111, to one side of which the scanning signals S1 to S4 are supplied, and switching signals U1, U2 to the other side via control inputs. The switching signals U1, U2 are generated by a comparator circuit with two comparators 112, 113 from the scanning signals S1 to S4. In this case the multiplexer 111 selects the respective signal with the maximum amplitude from the scanning signals S1 to S4, and combines these selected scanning signals S1 to S4 into a generating envelope curve, which represents the amplitude signal A. The amplitude signal A is directly proportional to the instantaneous amplitude level of the scanning signals S1 to S4. The signals in connection with this are represented in FIG. 3.

An alternative option for generating the amplitude signal A includes forming it computationally by the formula $A=S1^2+S2^2$. However, with this method a processor is required, while the first mentioned method can do without one. The amplitude signal A can also be generated by known rectifier circuits, for example in accordance with DE 44 28 673 A1, as well as by known methods for determining a maximum value, in that during the crossover of a scanning signal the instantaneous value of the scanning signal which is phase-shifted by 90° with respect to the former is accepted as the amplitude signal A.

The amplitude signal A is conducted to the deviation determination unit 12 for forming a deviation signal B. For this purpose, the deviation determination unit 12 compares the amplitude signal A with a predetermined nominal value F. As represented in FIG. 1, the nominal value signal F is preferably derived from the supply voltage V of the position measuring system by an arrangement 4.

The deviation signal B is differently weighted in the evaluation arrangement 14 as a function of its normal size, and is only then fed as the weighted deviation signal BG to the indicator 13. Weighting of the deviation signal B is performed in such a way that with a weak deviation signal B, i.e. if the amplitude signal A deviates only slightly from the nominal value F, or the nominal value, this deviation signal B is fed to the indicator 13 in a manner weighted less than would take place in case of a stronger deviation signal B. The evaluation arrangement 14 and the indicator 13 therefore assure that the deviation signal B is indicated by a lower value on the indicator 13 than would occur with a greater deviation signal B. Thus, the evaluation arrangement 14 assures that the reaction sensitivity of the indicator 13 to changes in the deviation signal B differs. The reaction sensitivity is less with weak deviation signals B than with stronger deviation signals B. Therefore the scale for displaying the deviation is a function of the amplitude signal A.

Figure 4:
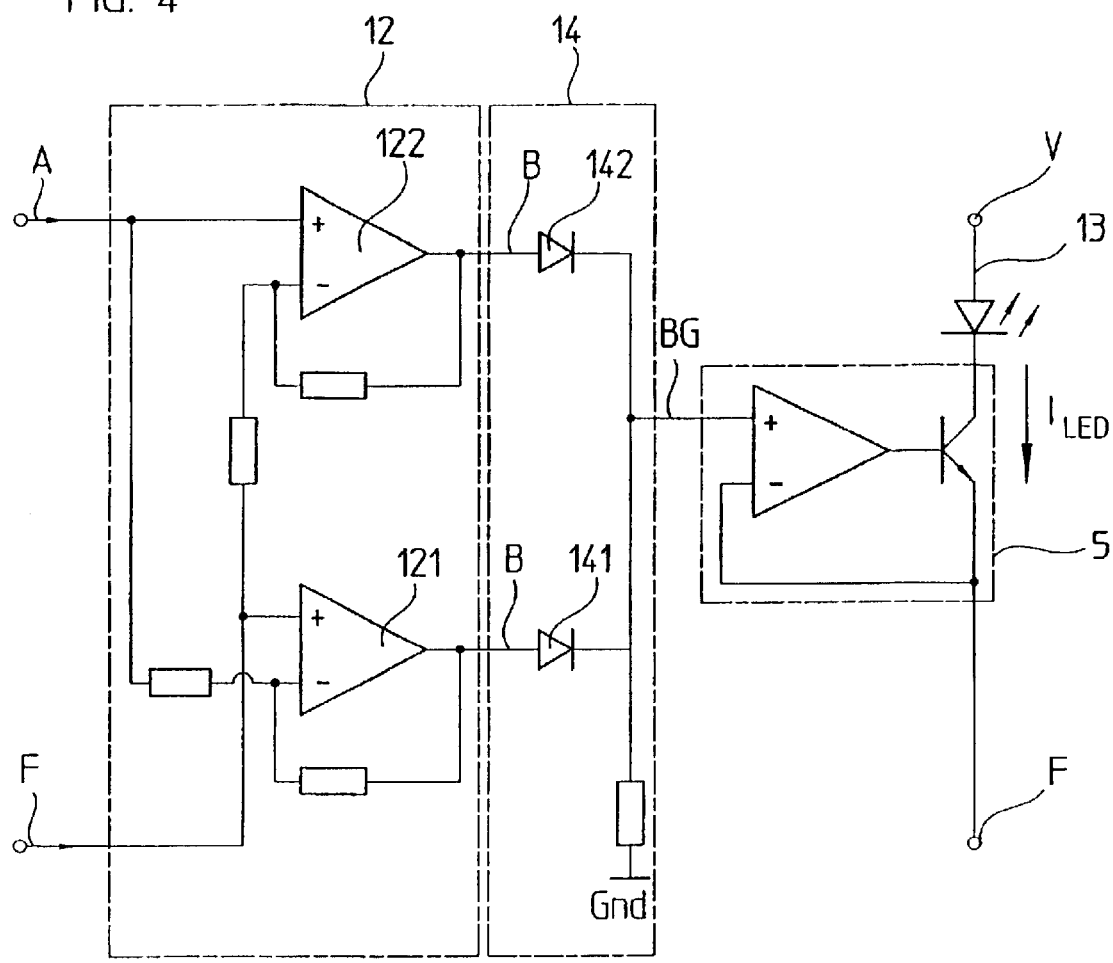
FIG. 4 represents a first exemplary embodiment of an evaluation unit in accordance with the present invention.
Figure 5:
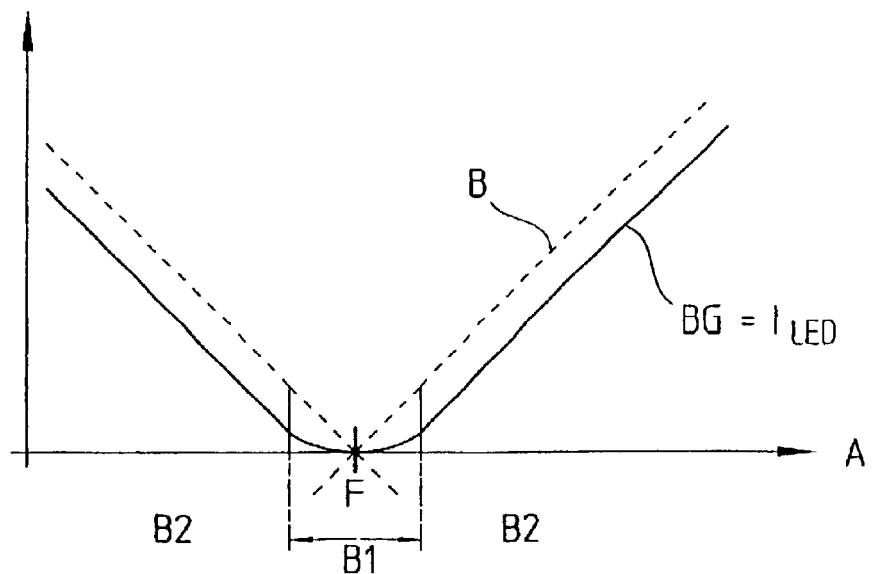
FIG. 5 is a signal diagram in connection with FIG. 4.

A first example of a deviation determination unit 12 for forming the deviation signal B, that of an evaluation arrangement 14 and an indicator 13, is represented in FIG. 4. This circuit includes at least one first comparator 121, a downstream-connected diode 141, as well as a downstream-connected light source 13 as the indicator. The first comparator in the form of a differential amplifier 121 produces the difference between the nominal signal F and the amplitude signal A as B=F−A. The differential signal produced in this way is the deviation signal B, which is fed to the diode 141 for weighting as a function of size. The diode 141 only becomes conductive if B is positive, and it weights B in accordance with the characteristic diode curve. The weighted deviation signal BG generated in this way constitutes the left branch of the signal diagram in accordance with FIG. 5, starting at the nominal signal F. It can be seen in FIG. 5 that a lesser weighting occurs up to a deviation between 10% to 25% of the amplitude signal A from the nominal signal F, and a larger weighting in connection with a stronger deviation signal B. The light intensity of the light source 13, which is controlled via a current source 5, changes in accordance with the weighting. The weighted deviation signal B, which is proportional to the current $I_{LED}$ from the light source 13, is represented in FIG. 5 as a function of the amplitude signal A. Thus, the first comparator 121 is used to determine whether the amplitude signal A is less than the nominal signal F.

It is now advantageous to determine in addition whether the amplitude signal A is stronger than the nominal signal F. A second amplifier 122 is used for this, which forms the deviation signal B=A−F. The downstream-connected diode 142 only becomes conducting if B is positive, and it weights B in accordance with the transmission characteristic. The weighted deviation signal BG generated in this way forms the right branch of the signal diagram in FIG. 5, starting at the nominal signal F.

Figure 7:
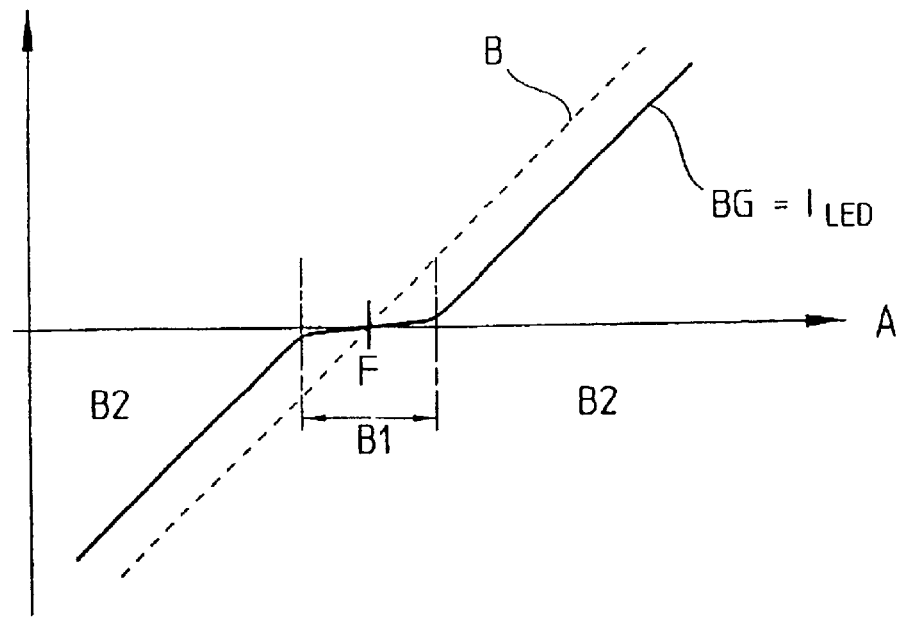
FIG. 7 is a signal diagram in connection with FIG. 6.

The low weighting of the deviation signal B in the area B1 of the nominal signal F has the advantage that in this area deviations from the nominal signal F are not indicated to the user to the same extent as in the remaining area B2. Fluctuations in the amplitude signal A in the area B1 of the nominal signal F do not cause any, or only small changes in the indication. The weighting is comparable to a multiplication of the deviation signal B by a multiplication factor. This multiplication factor is less in the area B1 than in the area B2 (FIGS. 5 and 7). In the area B1 the multiplication factor can also be zero, it can rise in the area B1 from zero to a predetermined value and then remain constant in area B2, or it can have a lesser constant value in the area B1, and in the area B2 a greater constant value. The variation of the indicator, and therefore the weighting of the deviation signal in accordance with an exponential function, is particularly advantageous.

For example, the nominal signal F may have a value of 0.5 V, in that case the area B1 is ±20% of the nominal signal F, i.e. ±0.1 V, therefore the limits between B1 and B2 lie at 0.5±0.1 V. Assuming that the multiplication factor is 20 in the area B1, and in the area B2 it is 200, a change of the amplitude signal A by 0.05 V in the area B1 causes a change in the weighted deviation signal BG, and therefore of the indicator, by 1 V or, more generally expressed, 1 unit. In contract to this, a change in the amplitude signal A by 0.05 V in the area B2 causes a change of the weighted deviation signal BG, and therefore of the indicator, by 10 V or, more generally formulated, by 10 units. Thus, in the course of installing the scanning head 2, the user receives a stronger indication regarding the tendency of the amplitude signal A in comparison with the area B1. This simplifies the installation, because changes in the amplitude in the area B1 have no negative effects on the ability of the position measuring system to function. Large changes of the indication in this area B1 would only confuse the user and feign an erroneous installation. For achieving the optimal installation state, and therefore functional state, of the position measuring system, it is advantageous if a tendency of the amplitude signal A is also made available to the user as an indication in the area B1. However, the multiplication factor within a very narrow range around the nominal value F can also be constantly zero.

For the sake of a simplified explanation of the present invention a border between the areas B1 and B2 was assumed in the above numerical example. A continuous change of the multiplication factor is of course particularly advantageous.

In the example represented, the indicator is the brightness of a light-emitting diode 13 attached to the scanning head 2. But other indicators can also be used.

Figure 6:
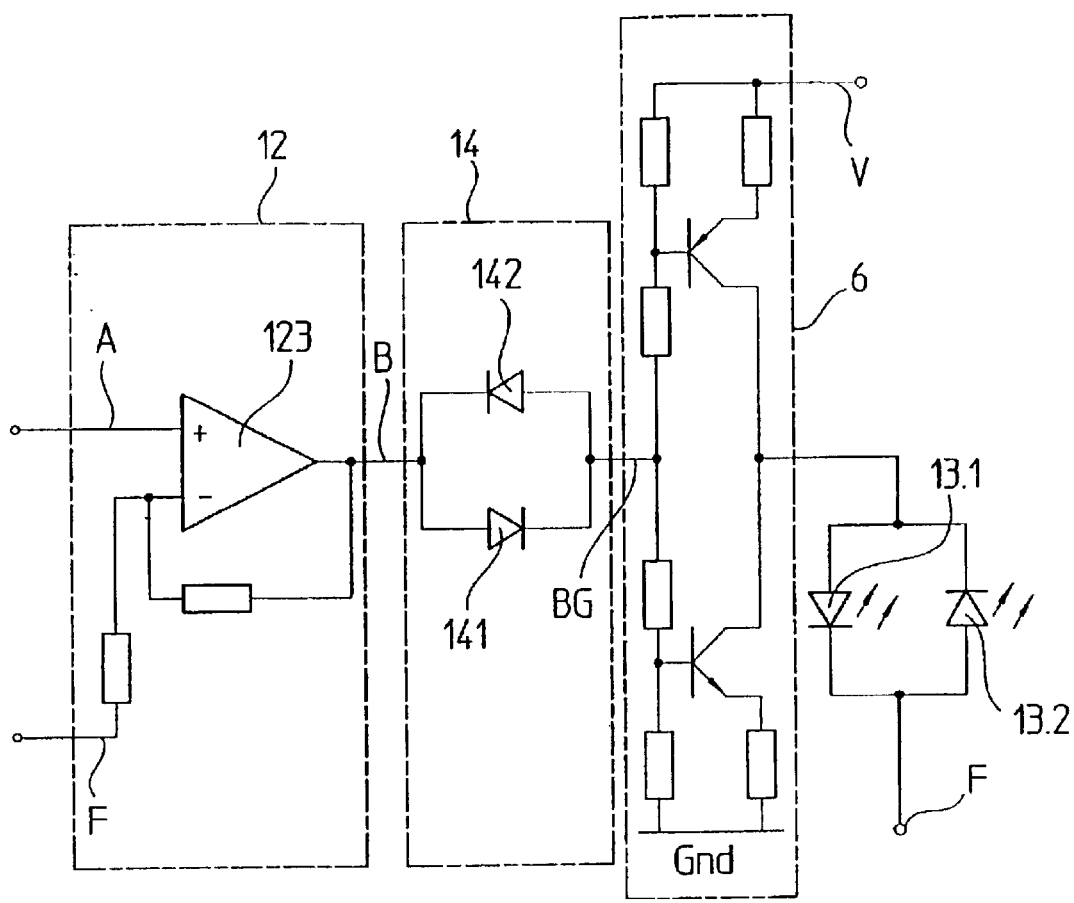
FIG. 6 represents a second exemplary embodiment of an evaluation unit in accordance with the present invention.

A further exemplary embodiment of the present invention will be explained by FIGS. 6 and 7. The deviation signal B is again produced by a differential amplifier 123. A parallel arrangement of two diodes 141, 142 is arranged downstream of the latter which, as a function of the sign and size of the deviation signal B, generate a weighted deviation signal BG represented in FIG. 7. A light-emitting diode unit in the form of a parallel connection of two light-emitting diodes 13.1, 13.2 of different colors is controlled from a current source 6 with current $I_{LED}$ proportionally with respect to this weighted deviation signal BG. In this example, one of the light emitting diodes shines in a first color if the amplitude signal is weaker than a nominal signal while the other light emitting diode shines in a second color if the amplitude signal is stronger than the nominal signal.

In place of the diodes 141, 142, different electrical components with an exponentially extending transmission characteristic similar to that of a diode can also be employed, in particular transistors.

The present invention can be used in connection with linear, as well as angle measuring systems. The scanning elements for scanning can in this case be optoelectrical elements, magnetic field-sensitive, capacitive, as well as inductive elements.

It is also possible with the arrangement in accordance with the present invention to detect signal errors, such as offset and amplitude differences between the scanning signals S1 to S4, which are phase-shifted by 90° with respect to each other, by the indicator 13, if the scanning head 2 is slowly displaced in the measuring direction X within a few signal periods.

Within the scope of the present invention, further embodiment variations of course also exist besides the explained example.

We claim:

1. A control device for controlling an amplitude level of an analog scanning signal of a position measuring system, the control device comprising:

a detector that determines an amplitude level of a scanning signal of a position measuring system and generates an amplitude signal as a function of said amplitude level;

a deviation determination unit that generates a deviation signal by comparing said amplitude signal with a predetermined nominal signal;

an indicator that provides an indication of proper set-up of a scanning head of said position measuring system as a function of said deviation signal; and an evaluation arrangement for differently weighting said deviation signal in such a way that with a weak deviation signal, a change in said deviation signal causes a small, or no variation of said indication, and in contrast thereto a larger variation of said indication is caused by a stronger deviation signal.

2. The control device in accordance with claim 1, wherein said change of said deviation signal causes a variation of said indication in accordance with an exponential function.

3. The control device in accordance with claim 1, wherein said detector comprises:

a multiplexer to which said scanning signal and a second scanning signal, which is phase-shifted with respect to said scanning signal, are applied; and a comparator which selects between said scanning signal and said second scanning signal based on which one has a larger amplitude and forms a generating envelope curve of positive half-waves of said scanning signal and said second scanning signal, wherein said generating envelope curve is an amplitude signal.

4. The control device in accordance with claim 2, wherein said detector comprises:
  a multiplexer to which said scanning signal and a second scanning signal, which is phase-shifted with respect to said scanning signal, are applied; and
  a comparator which selects between said scanning signal and said second scanning signal based on which one has a larger amplitude and forms a generating envelope curve of positive half-waves of said scanning signal and said second scanning signal, wherein said generating envelope curve is an amplitude signal.

5. The control device in accordance with claim 1, wherein said deviation determination unit comprises:
  a first comparator for forming a difference between said amplitude signal and a nominal signal; and
  a second comparator for forming a difference between said nominal signal and said amplitude signal.

6. The control device in accordance with claim 1, wherein said evaluation arrangement comprises an electrical component with a transmission characteristic of a diode.

7. The control device in accordance with claim 5, further comprising a first semiconductor component of a transmission characteristic of a diode that is arranged at an output of said first comparator and a second semiconductor component of a transmission characteristic of a diode that is arranged at an output of said second comparator.

8. The control device in accordance with claim 1, wherein a weighted deviation signal is present at an output of said evaluation arrangement, which is connected with a current source, which controls said indicator proportionally in accordance with said weighted deviation signal.

9. The control device in accordance with claim 1, wherein said indicator comprises a light source.

10. The control device in accordance with claim 3, wherein said indicator comprises a light source unit, which shines in a first color if said amplitude signal is weaker than said nominal signal, and which shines in a second color if said amplitude signal is stronger than said nominal signal.

11. A scanning head of a position measuring system, comprising:
  a control unit, said control unit comprising:
    a detector that determines an amplitude level of a scanning signal of a position measuring system and generates an amplitude signal as a function of said amplitude level;
    a deviation determination unit that generates a deviation signal by comparing said amplitude signal with a predetermined nominal signal;
    an indicator that provides an indication of proper set-up of a scanning head of said scanning head of said position measuring system as a function of said deviation signal; and
    an evaluation arrangement for differently weighting said deviation signal in such a way that with a weak deviation signal, a change in said deviation signal causes a small, or no variation of said indication, and in contrast thereto a larger variation of said indication is caused by a stronger deviation signal.

12. A position measuring system, comprising:
  a scale;
  a scanning head that scans said scale, wherein said scanning head comprises:
    a control device comprising:
      a detector that determines an amplitude level of a scanning signal of a position measuring system and generates an amplitude signal as a function of said amplitude level;
      a deviation determination unit that generates a deviation signal by comparing said amplitude signal with a predetermined nominal signal;
      an indicator that provides an indication of a proper set-up of said scanning head as a function of said deviation signal; and
      an evaluation arrangement for differently weighting said deviation signal in such a way that with a weak deviation signal, a change in said deviation signal causes a small, or no variation of said indication, and in contrast thereto a larger variation of said indication is caused by a stronger deviation signal.

13. A method for generating an indication regarding the amplitude level of at least one scanning signal of a position measuring system, the method comprising:
  determining an amplitude level of at least one scanning signal of a position measuring system;
  generating an amplitude signal based on said determined amplitude level;
  forming a deviation signal by comparing said generated amplitude signal with a predetermined nominal signal;
  providing an indication of a proper set-up of a scanning head of said position measuring system as a function of said deviation signal, wherein with a weak deviation signal, a change in said deviation signal causes a small, or no variation of said indication, and in contrast thereto a larger variation of said indication is caused by a stronger deviation signal.

14. The method for generating an indication in accordance with claim 13, wherein a change of said deviation signal causes a variation of said indication in accordance with an exponential function.

* * * * *